(12) United States Patent
Hashizume (10) Patent No.: US 11,940,010 B2
(45) Date of Patent: Mar. 26, 2024

(54) BEARING APPARATUS AND SPACER (71) Applicant: NTN Corporation, Osaka (JP)

(72) Inventor: Shohei Hashizume, Kuwana (JP)

(73) Assignee: NTN Corporation, Osaka (JP)

( * ) Notice: Subject to any disclaimer, the term of this patent is extended or adjusted under 35 U.S.C. 154(b) by 189 days.

(21) Appl. No.: 17/761,380

(22) PCT Filed: Sep. 4, 2020

(86) PCT No.: PCT/JP2020/033517
§ 371 (c)(1),
(2) Date: Mar. 17, 2022

(87) PCT Pub. No.: WO2021/059919
PCT Pub. Date: Apr. 1, 2021

(65) Prior Publication Data
US 2022/0373036 A1    Nov. 24, 2022

(30) Foreign Application Priority Data
Sep. 26, 2019    (JP) ................................ 2019-175887

(51) Int. Cl.
*F16C 19/52*    (2006.01)
*F16C 19/54*    (2006.01)
(Continued)

(52) U.S. Cl.
CPC .......... *F16C 41/004* (2013.01); *F16C 19/525* (2013.01); *F16C 19/548* (2013.01);
(Continued)

(58) Field of Classification Search
CPC .... F16C 19/525; F16C 19/548; F16C 33/586; F16C 41/004; F16C 41/007; F16C 2322/39; G01M 13/04
See application file for complete search history.

(56) References Cited

U.S. PATENT DOCUMENTS

| 9,624,978 | B2 * | 4/2017 | Ito ...................... F16C 33/6607 |
| 2015/0240872 | A1 * | 8/2015 | Ito .......................... F16N 29/02 |
| | | | 384/471 |
| 2016/0333937 | A1 * | 11/2016 | Mizutani ............... F16C 41/004 |

FOREIGN PATENT DOCUMENTS

| EP | 3 754 218 A1 | 12/2020 |
| JP | 2013-032211 A | 2/2013 |
| | (Continued) | |

OTHER PUBLICATIONS

International Search Report issued in corresponding International Patent Application No. PCT/JP2020/033517 dated Nov. 2, 2020, with English translation.

*Primary Examiner* — Phillip A Johnson
(74) *Attorney, Agent, or Firm* — Rimon P.C.

(57) ABSTRACT

A bearing apparatus supports a rotating body with a bearing including an inner ring, an outer ring, and a rolling element. The bearing apparatus includes a power generator including a Peltier element variable in amount of power generation depending on a temperature difference between the inner ring and the outer ring caused in the bearing and an abnormality sensing apparatus that senses abnormality of the bearing based on the amount of power generation by the power generator. Preferably, the abnormality sensing apparatus senses abnormality of the bearing based on any of the amount of power generation by the power generator, a time derivative value of the amount of power generation, and following relation between the amount of power generation and another parameter. The bearing apparatus and a spacer in which abnormality of the bearing can accurately be sensed early are thus provided.

8 Claims, 8 Drawing Sheets

(51) Int. Cl.
  *F16C 35/04* (2006.01)
  *F16C 41/00* (2006.01)
  *G01M 13/04* (2019.01)

(52) U.S. Cl.
  CPC .......... *F16C 35/042* (2013.01); *F16C 41/007* (2013.01); *G01M 13/04* (2013.01); *F16C 2322/39* (2013.01)

(56) References Cited

FOREIGN PATENT DOCUMENTS

| JP | 2017-026078 A | 2/2017 | |
|---|---|---|---|
| JP | 2019-074040 A | 5/2019 | |
| WO | 2013/002199 A1 | 1/2013 | |
| WO | WO-2013002199 A1 * | 1/2013 | ............. B65G 39/09 |
| WO | WO-2018074313 A1 * | 4/2018 | ............. F16C 33/66 |
| WO | WO-2018088227 A1 * | 5/2018 | ............. F16C 19/16 |
| WO | 2019/159838 A1 | 8/2019 | |

* cited by examiner

BEARING APPARATUS AND SPACER

CROSS REFERENCE TO RELATED APPLICATIONS

This application is the U.S. National Phase under 35 U.S.C. § 371 of International Application No. PCT/JP2020/033517 filed on Sep. 4, 2020, which claims the benefit of Japanese Application No. 2019-175887, filed on Sep. 26, 2019, the entire contents of each are hereby incorporated by reference.

TECHNICAL FIELD

This invention relates to a bearing apparatus and a spacer.

BACKGROUND ART

A bearing for a main spindle of a machine tool is often used at a high speed and under low load, and an angular contact ball bearing is widely employed for such a bearing. The bearing for the main spindle of the machine tool is lubricated by air-oil (oil-mist) lubrication or grease lubrication. Air-oil lubrication is characterized in ability to maintain a stable lubricated state for a long period of time because of external supply of lubricating oil. Grease lubrication is characterized in excellent cost efficiency because of requirement of neither of an annexed facility and a pipe and in environmental friendliness because of an extremely small amount of generation of mist.

A bearing used in a higher-speed region such as a region where a do value calculated by multiplying an inner diameter of an inner ring by the number of rotations is equal to or larger than one million as in a main spindle of a machining center among machine tools should operate in a more stable manner. For various factors described below, however, the bearing may undergo surface roughening or peeling at a bearing raceway surface or abnormality of a retainer, and thereafter a temperature of the bearing may excessively increase.

Inappropriate feed and drain of lubricating oil in air-oil lubrication (excessively small or large amount of oil or insufficient exhaust)

Deterioration of lubricating grease sealed in bearing

Entry of coolant or water or a foreign matter into a bearing rolling portion

Oil film rupture due to excessive preload, that is, increase in contact pressure in rolling portion In order to prevent excessive temperature increase in the bearing due to the above factors, Japanese Patent Laying-Open No. 2017-26078 (PTL 1) discloses such a technique that a lubrication oil feed pump and a contactless temperature sensor are contained in a spacer adjacent to a bearing and the lubrication oil feed pump feeds lubricating oil to the inside of the bearing in accordance with a temperature value of a bearing lubricated portion measured by the temperature sensor.

CITATION LIST

Patent Literature

PTL 1: Japanese Patent Laying-Open No. 2017-26078

SUMMARY OF INVENTION

Technical Problem

Burning of the bearing is often accompanied by more instantaneous and abrupt temperature increase than in a normal high-speed rotation operation. Therefore, for example, even though a temperature in the vicinity of the bearing (specifically, a temperature of an outer ring of the bearing) in a housing distant from a heat generation source is measured, it is difficult to sense instantaneous and abrupt temperature increase in the bearing. In measuring a temperature of an inner ring of the bearing, the temperature should contactlessly be measured because the inner ring rotates.

The problem above is similar also in a temperature sensor contained in a spacer adjacent to the bearing. As described in Japanese Patent Laying-Open No. 2017-26078, when the temperature sensor contained in the spacer is of a contactless type, the temperature sensor is greatly affected by lubricating oil in the inside of the bearing and it is difficult to measure the temperature at a surface of a metal low in emissivity of infrared rays. It is thus difficult to accurately measure the temperature.

The present invention was made to solve the problems above, and an object thereof is to provide a bearing apparatus and a spacer in which abnormality of a bearing can be sensed accurately and early.

Solution to Problem

The present disclosure relates to a bearing apparatus that supports a rotating body with a bearing, the bearing including an inner ring, an outer ring, and a rolling element. The bearing apparatus includes a power generator including a Peltier element variable in amount of power generation depending on a temperature difference between the inner ring and the outer ring caused in the bearing and an abnormality sensing apparatus that senses abnormality of the bearing based on the amount of power generation by the power generator.

Preferably, the abnormality sensing apparatus senses abnormality of the bearing based on at least one of the amount of power generation, a time derivative value of the amount of power generation, and following relation between the amount of power generation and another parameter.

Preferably, the bearing apparatus further includes a power storage apparatus in which electric power generated by the power generator is stored, a load circuit that uses electric power in the power storage apparatus, and a power supply that supplies a power supply voltage to the load circuit upon receiving a voltage of the power storage apparatus.

Preferably, the bearing apparatus further includes a power storage apparatus in which electric power generated by the power generator is stored. The abnormality sensing apparatus senses abnormality of the bearing based on a value resulting from time derivative of an amount of stored power in the power storage apparatus.

Preferably, the bearing apparatus further includes a spacer arranged adjacently to the bearing. The spacer includes an inner-ring spacer that abuts on the inner ring and an outer-ring spacer that abuts on the outer ring. The power generator is arranged in the outer-ring spacer.

Preferably, the bearing apparatus is configured to support a rotation shaft of a machine tool.

According to another aspect, the present disclosure relates to a spacer arranged adjacently to a bearing that supports a rotating body. The bearing includes an inner ring, an outer ring, a rolling element, and a retainer. The spacer includes a power generator including a Peltier element variable in amount of power generation depending on a temperature difference between the inner ring and the outer ring caused in the bearing and an abnormality sensing apparatus that senses abnormality of the bearing based on the amount of power generation by the power generator.

Preferably, the spacer further includes an inner-ring spacer that abuts on the inner ring and an outer-ring spacer that abuts on the outer ring. The power generator is arranged in the outer-ring spacer.

Advantageous Effects of Invention

In the bearing apparatus in the present disclosure, a module that generates electric power based on a temperature difference between the inner ring and the outer ring of the bearing in the bearing apparatus is mounted in the vicinity of a bearing raceway surface. Therefore, a state of the bearing can be monitored or abnormality can be sensed based on an output obtained from the module.

DESCRIPTION OF EMBODIMENTS

An embodiment of the present invention will be described below with reference to the drawings. The same or corresponding elements in the drawings below have the same reference characters allotted and description thereof will not be repeated.

First Embodiment

Figure 1:
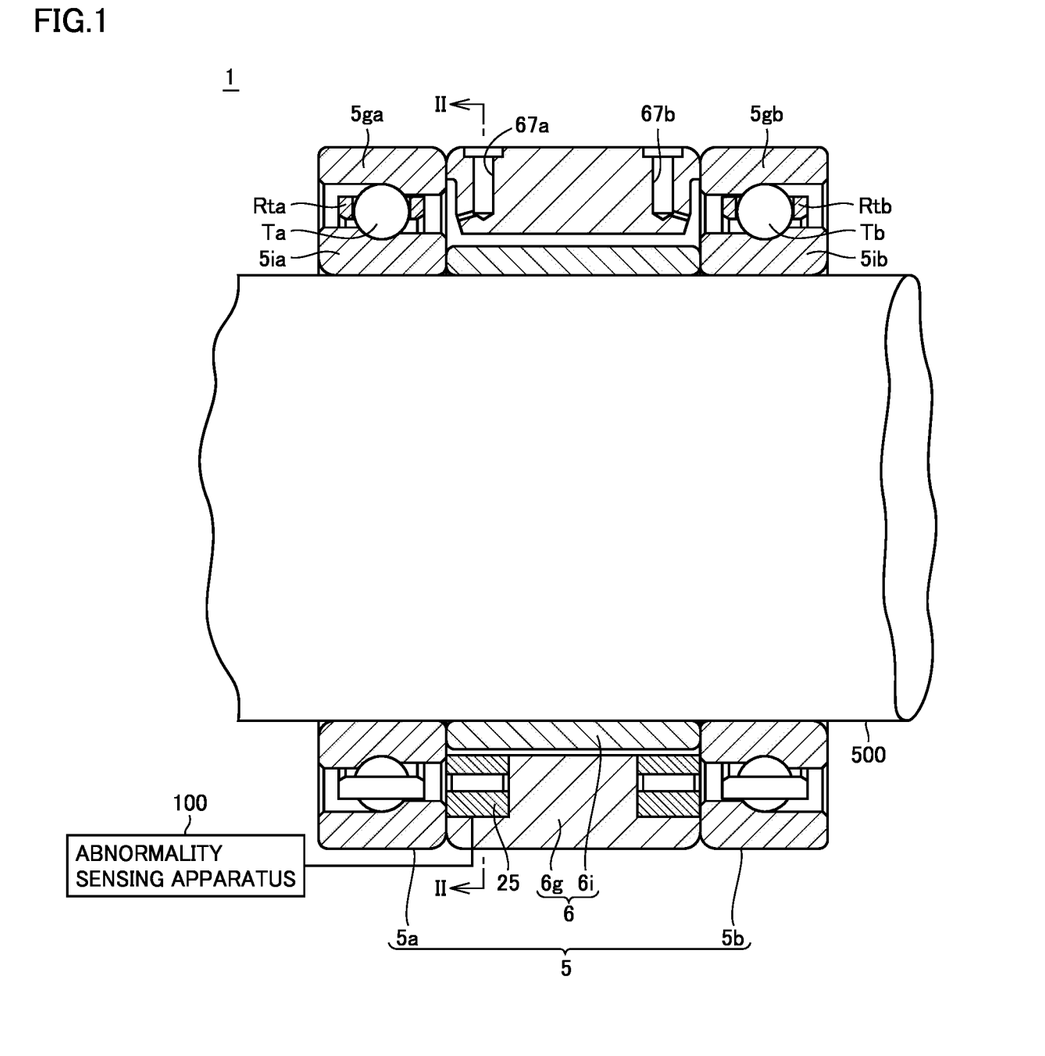
FIG. 1 is a cross-sectional view along a rotation shaft of a bearing apparatus in the present embodiment.
Figure 2:
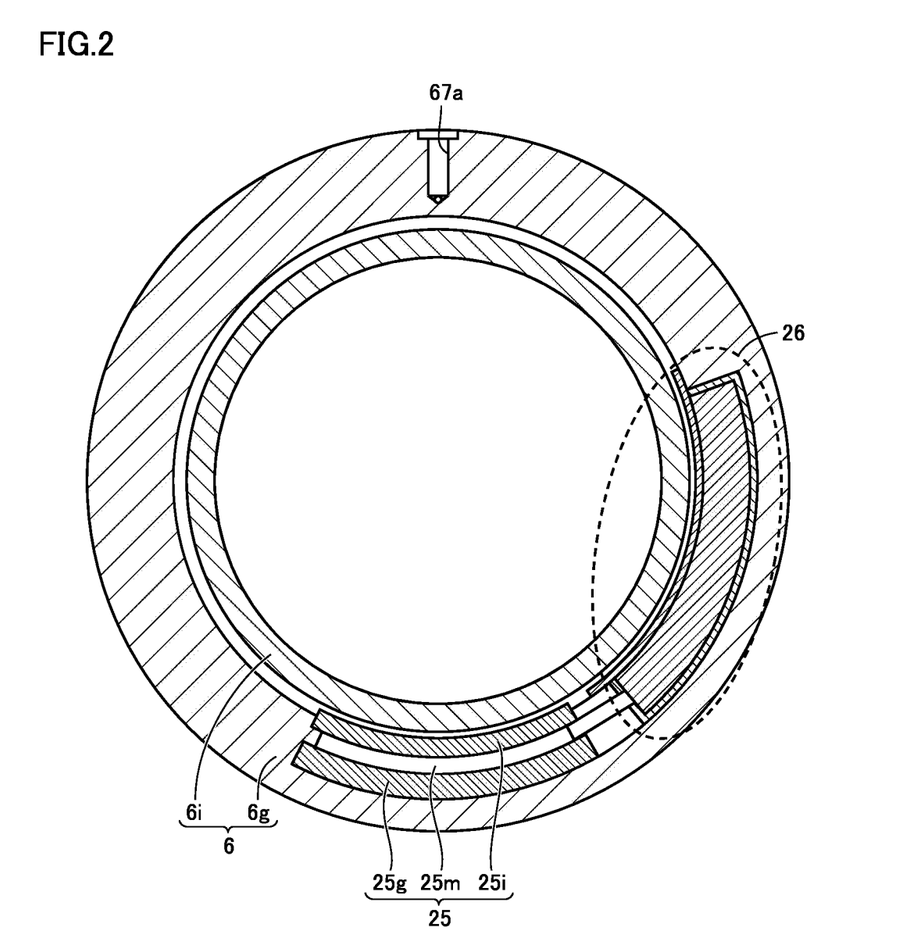
FIG. 2 is a cross-sectional view along II-II in FIG. 1.

FIG. 1 is a cross-sectional view along a rotation shaft of a bearing apparatus in the present embodiment. FIG. 2 is a cross-sectional view along II-II in FIG. 1.

Referring to FIGS. 1 and 2, a bearing apparatus 1 supports a rotating body 500 with a bearing including inner rings 5ia and 5ib, outer rings 5ga and 5gb, and rolling elements Ta and Tb. Bearing apparatus 1 includes a power generator 25 including a Peltier element variable in amount of power generation depending on a temperature difference between inner ring 5ia and outer ring 5ga caused in bearing 5 and an abnormality sensing apparatus 100 that senses abnormality of bearing 5 based on the amount of power generation by power generator 25.

Bearing 5a includes an inner ring 5ia, an outer ring 5ga, a rolling element Ta, and a retainer Rta. Bearing 5b includes an inner ring 5ib, an outer ring 5gb, a rolling element Tb, and a retainer Rtb. Bearing 5a is a rolling bearing in which a plurality of rolling elements Ta are arranged between inner ring 5ia and outer ring 5ga. Intervals between rolling elements Ta are held by retainer Rta. Bearing 5b is a rolling bearing in which a plurality of rolling elements Tb are arranged between inner ring 5ib and outer ring 5gb. Intervals between rolling elements Tb are held by retainer Rtb.

An angular contact ball bearing, a deep groove ball bearing, a cylindrical roller bearing, or a tapered roller bearing can be employed as bearings 5a and 5b. The angular contact ball bearing is employed in bearing apparatus 1 shown in FIG. 1.

Bearing apparatus 1 further includes a spacer 6 arranged adjacently to bearing 5. Two bearings 5a and 5b are provided in back-to-back duplex bearing (DB) arrangement with spacer 6 being interposed. The spacer includes an inner-ring spacer 6i that abuts on inner ring 5ia and an outer-ring spacer 6g that abuts on outer ring 5ga. Power generator 25 is arranged in outer-ring spacer 6g. Though FIG. 1 shows an example in which two rows of bearings are arranged in back-to-back duplex arrangement, the number of rows and combination are not limited as such and the construction may be otherwise.

Inner-ring spacer 6i is constructed similarly to a general spacer. Lubricating oil supply paths 67a and 67b that are paths for supply of air-oil for cooling and lubrication of bearings 5a and 5b are provided in outer-ring spacer 6g in its upper portion. Lubricating oil is injected in a state of air-oil or oil mist together with air that carries lubricating oil from emission holes (nozzles). FIG. 1 does not show the lubricating oil supply paths for the sake of brevity. When a grease lubricated bearing is employed as bearings 5a and 5b, lubricating oil supply paths 67a and 67b do not have to be provided.

Bearing apparatus 1 is constructed to support a rotation shaft of a machine tool as rotating body 500. Examples of the machine tool include a built-in motor type spindle apparatus of a machine tool. In this case, rotating body 500 is a main spindle having one end connected to a cutting tool such as an end mill and the other end rotated by a motor.

Power generator 25 and electric circuitry 26 are incorporated in outer-ring spacer 6g. Power generator 25 and electric circuitry 26 are arranged in an accommodation space provided on an inner circumferential side of outer-ring spacer 6g. Power generator 25 is connected to electric circuitry 26 and abnormality sensing apparatus 100 is included in electric circuitry 26.

In the present embodiment, for example, a thermoelectric element (Peltier element) that generates electric power based on the Seebeck effect can be employed as power generator 25 that generates electric power based on a temperature difference between inner ring 5ia and outer ring 5ga of bearing 5a.

For example, a motor that is a heat generation source is contained in a spindle of a built-in motor type spindle apparatus of a machine tool that rotates at a high speed, and hence heat generation in the entire spindle is great. Therefore, a structure for cooling a jacket of the spindle (jacket cooling) is often adopted. In this case, the temperature of inner ring 5ia being in contact with a shaft poor in heat radiation in addition to being affected by heat generation by the motor is higher than the temperature of outer ring 5g being in contact with a housing good in heat radiation in addition to being affected by jacket cooling. Therefore, the temperature difference between inner ring 5ia and outer ring 5ga of bearing 5a also increases. An output from the Peltier element that generates electric power based on the temperature difference is thus higher in sensitivity and speed of reaction to a sensor output than a temperature sensor (a contactless temperature sensor or a thermocouple) that measures an outer circumferential surface of the spindle or a bearing outer-ring outside surface to which introduction of an annexed facility is not necessary. In the present embodiment, by making use of such characteristics of the Peltier element, abnormality such as burning of the bearing is determined early.

In the present embodiment, bearing apparatus 1 contains the power generator (including the Peltier element). The Peltier element is provided in a non-rotating portion such as a bearing, a spacer adjacent to the bearing, a housing, or a lid, and is not in contact with a rotating portion. In order to utilize heat radiation from the rotating portion, power generator 25 and the rotating portion are preferably arranged as proximate as possible to each other, although they are not in contact with each other.

Though power generator 25 is not in contact with inner-ring spacer 6i (rotating portion) in the present embodiment, it is arranged in proximity thereto. Electric circuitry 26 including a power storage apparatus (capacitor) in which electric power generated by power generator 25 is stored, a controller, and a power supply is also mounted on outer-ring spacer 6g.

As shown in FIG. 2, power generator 25 includes a heat sink 25g connected to outer-ring spacer 6g, a heat sink 25i arranged as being opposed to inner-ring spacer 6i, and a thermoelectric element 25m arranged between the two heat sinks.

When a rolling bearing is employed as bearing 5 as shown in FIG. 1, the temperature of inner rings 5ia and 5ib and outer rings 5ga and 5gb increases due to heat of friction against rolling elements Ta and Tb. Since outer rings 5ga and 5gb are normally incorporated in the housing of equipment, heat in outer rings 5ga and 5gb is radiated by heat conduction to the housing. Therefore, the temperature difference is produced between inner rings 5ia and 5ib and outer rings 5ga and 5gb (inner rings 5ia and 5ib are higher in temperature than outer rings 5ga and 5gb). The temperature of outer ring 5ga conducts to heat sink 25g by heat conduction. The temperature of inner ring 5ia conducts to inner ring 6i by heat conduction and thereafter conducts to heat sink 25i by heat radiation. A temperature difference is thus produced between opposing end surfaces of thermoelectric element 25m arranged between heat sinks 25g and 25i. Therefore, thermoelectric element 25m can generate electric power owing to the Seebeck effect.

A metal high in thermal conductivity is employed for heat sinks 25g and 25i. For example, examples of the metal include gold, silver, and copper. From a point of view of costs, copper is generally used. A copper alloy mainly composed of copper may be employed.

Figure 3:
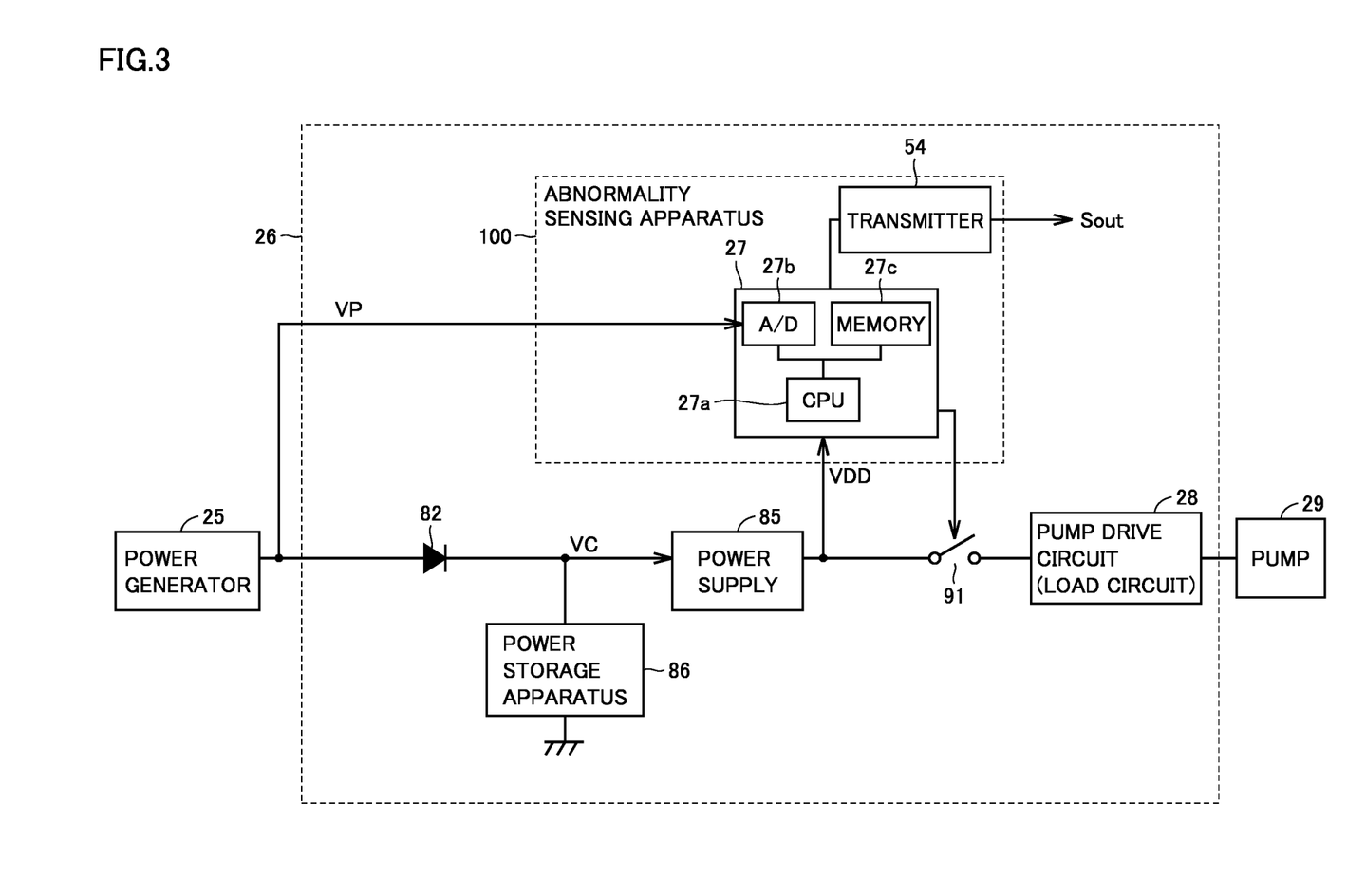
FIG. 3 is a block diagram showing details of electric circuitry in a first embodiment.

FIG. 3 is a block diagram showing details of electric circuitry in a first embodiment. Referring to FIG. 3, electric circuitry 26 includes a rectification diode 82, a power storage apparatus 86, a power supply 85, abnormality sensing apparatus 100, a switch 91, and a pump drive circuit 28. Pump drive circuit 28 drives a pump 29. Pump drive circuit 28 is an exemplary electric load circuit to which electric power is supplied by power supply 85 and may be connected to another load.

Abnormality sensing apparatus 100 includes a microcomputer 27 and a transmitter 54. Microcomputer 27 includes a central processing unit (CPU) 27a, an A/D converter 27b, and a memory 27c.

A power supply voltage VDD is supplied from power supply 85 to microcomputer 27. A/D converter 27b receives a voltage VP provided by power generator 25 and converts the voltage into a digital value. A program to be executed by CPU 27a and data used by CPU 27a is stored in memory 27c.

CPU 27a performs an abnormality sensing operation which will be described later and also controls switch 91.

Charges (power) generated by power generator 25 are stored in power storage apparatus 86. Power storage apparatus 86 includes a storage cell or a capacitor. An electric double layer capacitor is preferably employed as the capacitor.

As described with reference to FIGS. 1 to 3 above, bearing apparatus 1 further includes power storage apparatus 86 in which electric power generated by power generator 25 is stored, a load circuit (pump drive circuit 28) that uses electric power in power storage apparatus 86, and power supply 85 that supplies power supply voltage VDD to the load circuit (pump drive circuit 28) upon receiving the voltage from power storage apparatus 86.

Figure 4:
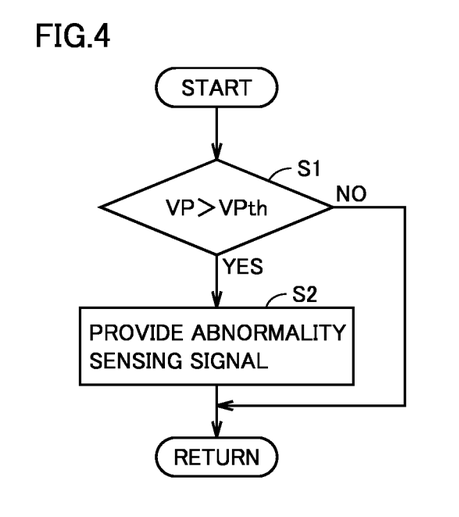
FIG. 4 is a flowchart for illustrating processing performed by an abnormality sensing apparatus in the first embodiment.

FIG. 4 is a flowchart for illustrating processing performed by the abnormality sensing apparatus in the first embodiment. Referring to FIGS. 3 and 4, in step S1, abnormality sensing apparatus 100 determines whether or not power generation voltage VP generated by the Peltier element and provided from power generator 25 is higher than a judgment threshold value VPth.

When a condition of VP>VPth is satisfied (YES in S1), in step S2, abnormality sensing apparatus 100 provides an abnormality sensing signal Sout to a not-shown receiver from transmitter 54.

When the condition of VP>VPth is not satisfied (NO in S1), the process returns to a main routine without the processing in step S2 being performed, and determination processing in step S1 is again repeatedly performed.

Figure 5:
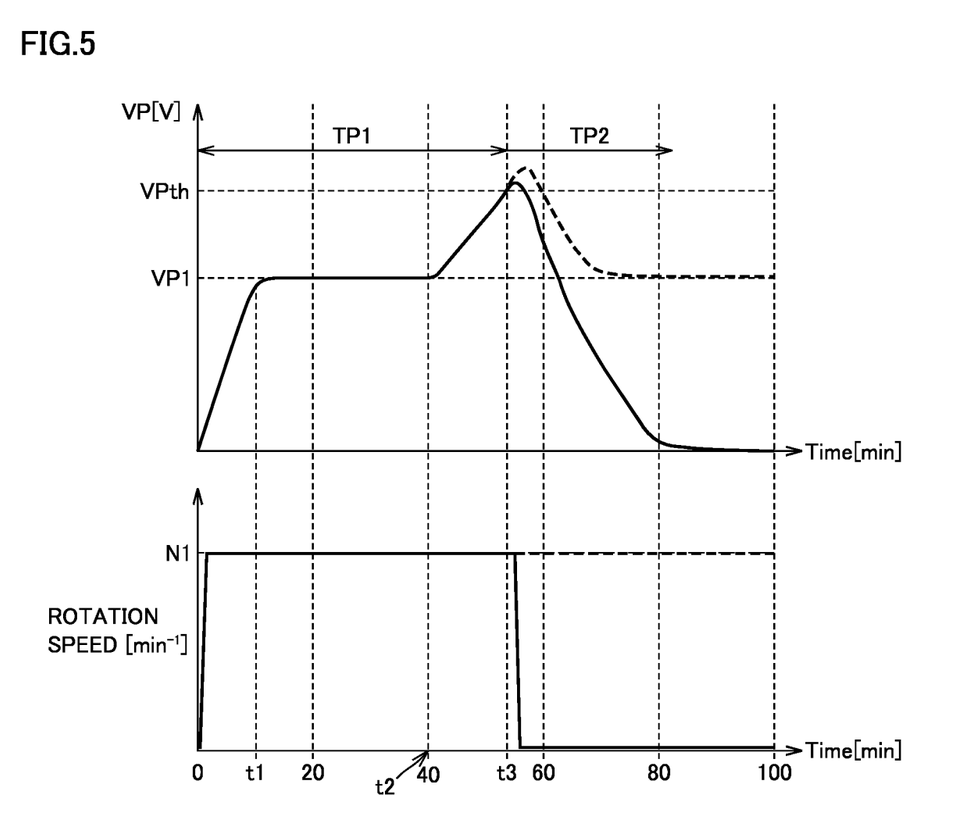
FIG. 5 is an operational waveform diagram showing relation between an amount of power generation by a Peltier element and a rotation speed in the first embodiment.

FIG. 5 is an operational waveform diagram showing relation between an amount of power generation by the Peltier element and a rotation speed in the first embodiment. FIG. 5 shows change over time in power generation voltage VP generated by the Peltier element and a rotation speed N of rotating body 500.

From time 0 to t3, the bearing apparatus is operated at a constant rotation speed N1 that is normally used. From time 0 to t1, power generation voltage VP gradually increases from 0 V to VP1, and from time t1 to t2, the power generation voltage exhibits a stable voltage VP1. From time t2 to t3, power generation voltage VP further increases due to abnormality of the bearing, and at time t3, the power generation voltage reaches a threshold value VPth.

By appropriately setting judgment threshold value VPth, abnormality of the bearing can be sensed based on observation of power generation voltage VP on the occurrence of abnormal increase in temperature. A waveform shown with a solid line represents a case that the machine tool stops operating in response to abnormality sensing signal Sout when power generation voltage VP reaches threshold value VPth. In this case, rotation speed N varies from N1 to 0 at a time point past time t3, and then power generation voltage VP gradually lowers from threshold value VPth to 0. A waveform shown with a dashed line represents a case that a lubricating oil pump is driven in response to abnormality sensing signal Sout and lubricating oil is supplied to the bearing. In this case, abnormality of the bearing is eliminated, and soon thereafter, power generation voltage VP returns to stable voltage VP1 similarly to a state from time t1 to t2.

Electric power generated by power generator 25 is stored in power storage apparatus 86 during a period TP1 until power generation voltage VP exceeds judgment threshold value VPth, and during a period TP2 for which the abnormality sensing signal is provided, electric power is used for transmission of the abnormality sensing signal or an operation for addressing abnormality (drive of the lubricating oil pump or the like).

In other words, electric power generated by the Peltier element is stored while there is no abnormality in bearing 5, and when abnormality occurs in bearing 5, electric power stored until then can effectively be used for "a warning indicating abnormality of the bearing (including transmission to the outside)" or "drive of a lubrication pump for supply into the bearing."

As described above, in the first embodiment, by making use of characteristics of the Peltier element that generates electric power based on the temperature difference between the inner ring and the outer ring caused during operations of the bearing, abnormality sensing apparatus 100 makes determination as to abnormality of the bearing based on an amount of power generation.

In the example shown in FIGS. 4 and 5, power generation voltage VP is simply compared with judgment threshold value VPth. Abnormality sensing apparatus 100, however, may sense abnormality of bearing 5a based on at least one of the amount of power generation and a time derivative value (an inclination or a rate of change) of the amount of power generation.

Second Embodiment

In a second embodiment, an example of sensing of abnormality in consideration of the rotation speed of rotating body 500 will be described.

Figure 6:
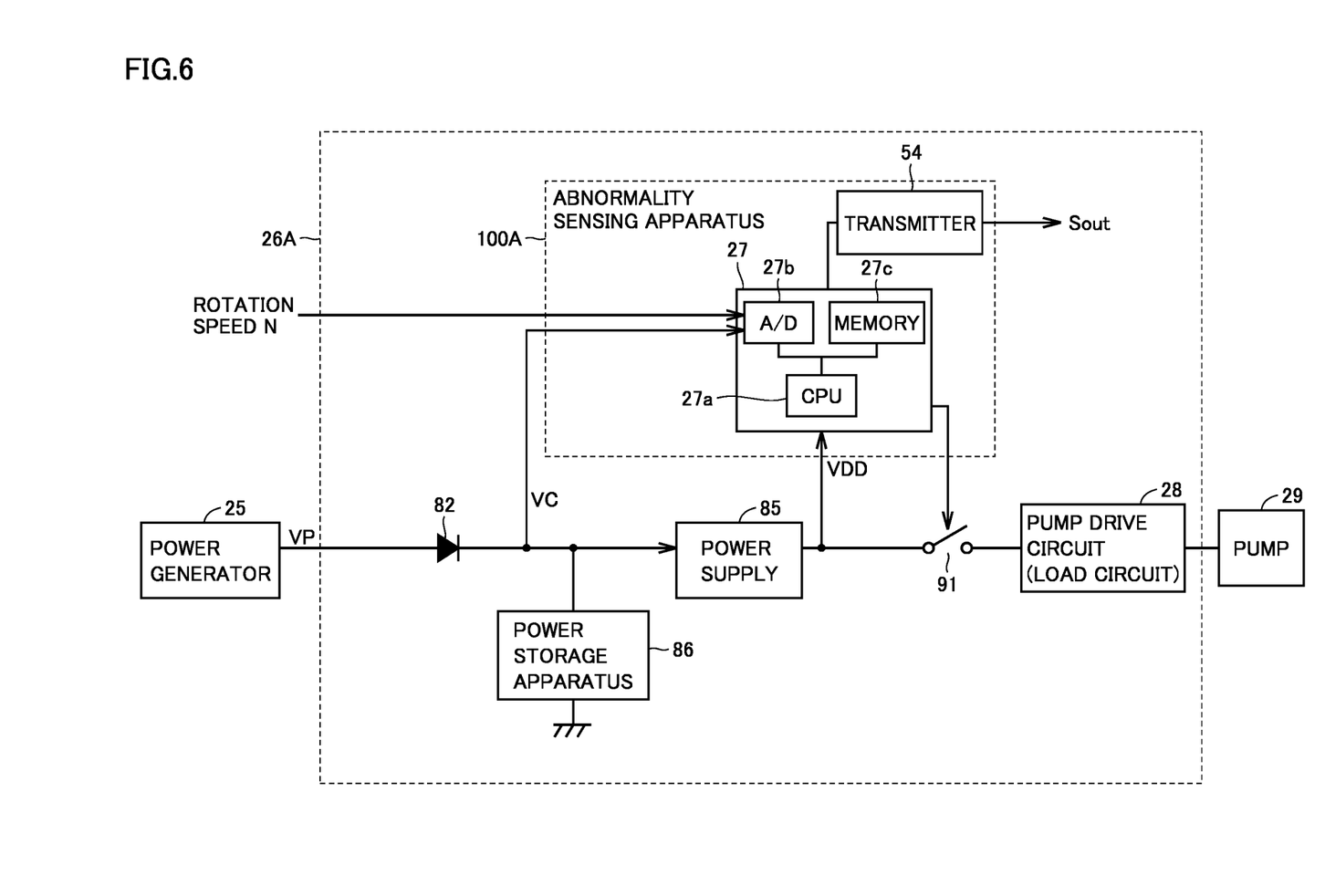
FIG. 6 is a block diagram showing details of electric circuitry in a second embodiment.

FIG. 6 is a block diagram showing details of electric circuitry in the second embodiment. Referring to FIG. 6, electric circuitry 26A includes an abnormality sensing apparatus 100A instead of abnormality sensing apparatus 100 in the configuration of electric circuitry 26 shown in FIG. 3. Since electric circuitry 26A is otherwise similar in configuration to electric circuitry 26 described with reference to FIG. 3, description will not be repeated.

Abnormality sensing apparatus 100A includes microcomputer 27 and transmitter 54. Microcomputer 27 includes central processing unit (CPU) 27a, A/D converter 27b, and memory 27c.

Power supply voltage VDD is supplied to microcomputer 27 from power supply 85. In the second embodiment, A/D converter 27b receives a power storage voltage VC of power storage apparatus 86 and rotation speed N of rotating body 500 and converts them into digital values. A program to be executed by CPU 27a and data to be used by CPU 27a are stored in memory 27c.

CPU 27a performs an abnormality sensing operation which will be described later and also controls switch 91.

In the second embodiment, bearing apparatus 1 includes power storage apparatus 86 in which electric power generated by power generator 25 is stored. Abnormality sensing apparatus 100A senses abnormality of the bearing based on a value resulting from time derivative of voltage VC indicating an amount of power stored in power storage apparatus 86.

Figure 7:
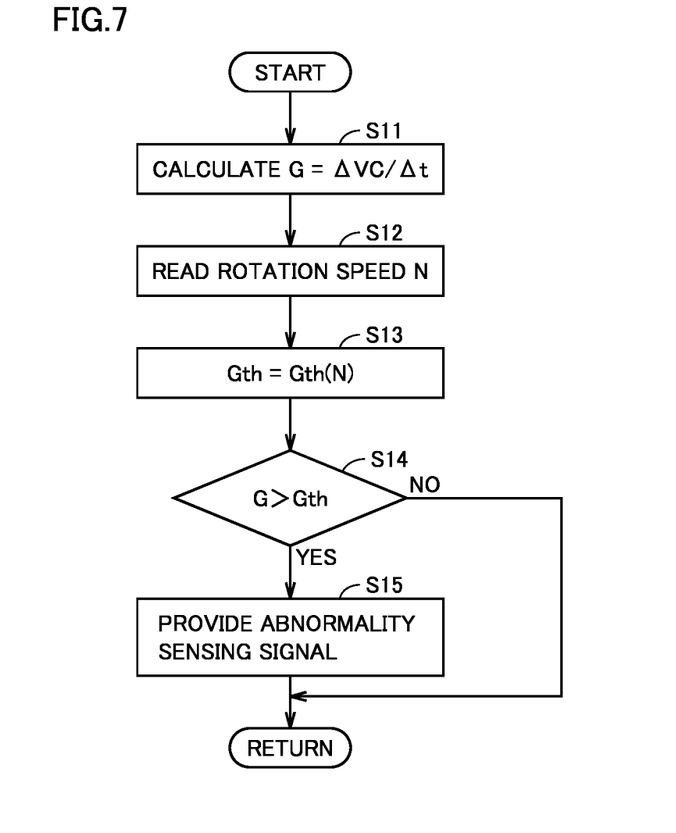
FIG. 7 is a flowchart for illustrating processing performed by the abnormality sensing apparatus in the second embodiment.

FIG. 7 is a flowchart for illustrating processing performed by the abnormality sensing apparatus in the second embodiment. Referring to FIGS. 6 and 7, in step S11, abnormality sensing apparatus 100A samples power storage voltage VC of power storage apparatus 86 and calculates an inclination $G=\Delta VC/\Delta t$ from a difference $\Delta VC$ from power storage voltage VC and a difference $\Delta t$ in sampling time in previous sampling.

In succession, in step S12, abnormality sensing apparatus 100A reads rotation speed N of rotating body 500 from a not-shown rotation speed sensor or the like.

In succession, in step S13, abnormality sensing apparatus 100A sets a judgment threshold value Gth(N) corresponding to rotation speed N as a judgment threshold value Gth for inclination G calculated in step S11. Judgment threshold value Gth(N) corresponding to rotation speed N is determined in advance for each rotation speed and stored in memory 27c. In step S13, abnormality sensing apparatus 100A reads judgment threshold value Gth(N) from memory 27c for use.

In step S14, abnormality sensing apparatus 100A determines whether or not inclination G calculated in step S11 is larger than judgment threshold value Gth.

When a condition of G>Gth is satisfied (YES in S14), in step S15, abnormality sensing apparatus 100A provides abnormality sensing signal Sout to a not-shown receiver from transmitter 54.

When the condition of G>Gth is not satisfied (NO in S14), the process returns to the main routine without the processing in step S15 being performed, and determination processing from step S11 is again repeatedly performed.

Figure 8:
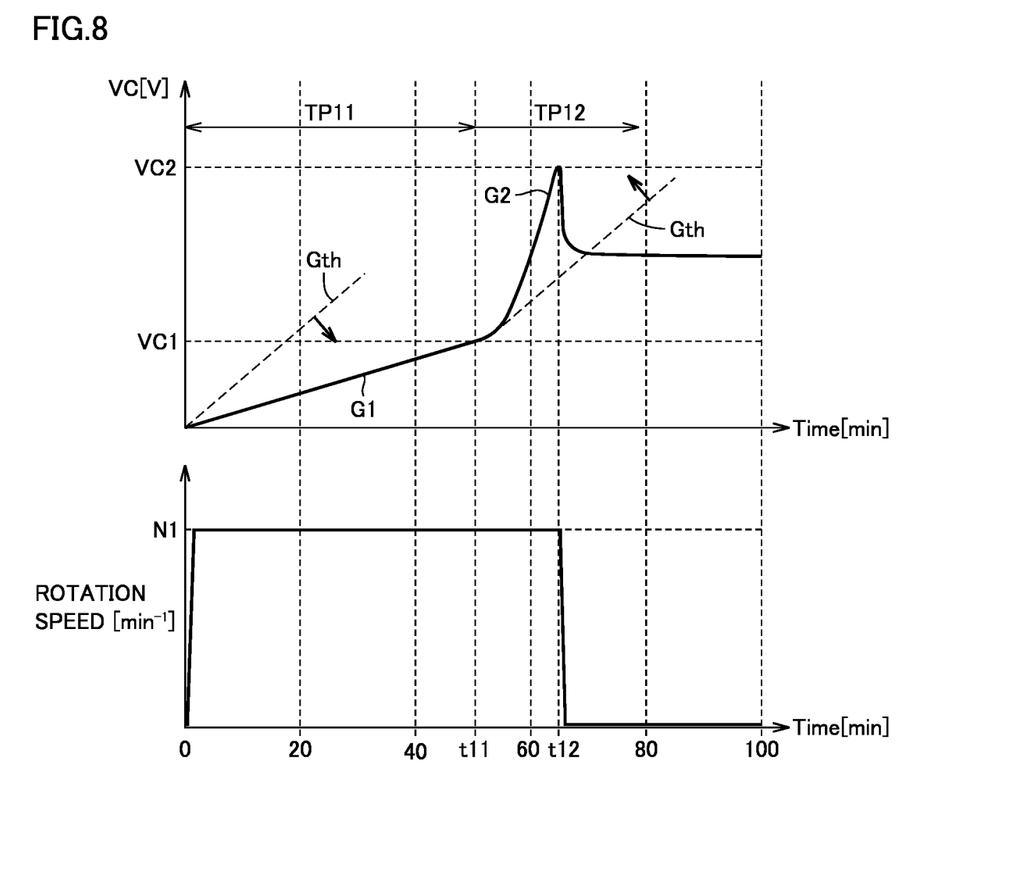
FIG. 8 is an operational waveform diagram showing relation between a power storage voltage and a rotation speed in the second embodiment.

FIG. 8 is an operational waveform diagram showing relation between a power storage voltage and a rotation speed in the second embodiment. FIG. 8 shows change over time in power storage voltage VC in power storage apparatus 86 and rotation speed N of rotating body 500.

From time 0 to t12, the machine tool is operated at rotation speed N1 that is normally used. From time 0 to t11, a stable operation is performed, and consequently, power storage voltage VC gradually increases from 0 V to VC1. Since an inclination G1 is smaller than threshold value Gth during this period, the abnormality sensing signal is not provided.

Abnormality occurs in the bearing at time t11, and from time t11 to t12, power storage voltage VC further increases to VC2. At this time, inclination G of increase in voltage VC also increases from G1 to G2. At this time, by appropriately setting judgment threshold value Gth between inclination G1 and inclination G2, abnormality of the bearing can be sensed based on observation of the rate of change in power storage voltage VC on the occurrence of abnormal increase in temperature. At time t12, the machine tool stops operating in response to an output of the abnormality sensing signal, and power storage voltage VC no longer increases.

Electric power generated in power generator 25 is stored in power storage apparatus 86 during a period TP11 until inclination G exceeds judgment threshold value Gth, and during a period TP12 for which the abnormality sensing signal is provided, electric power is used for transmission of the abnormality sensing signal or an operation (drive of the lubricating oil pump or the like) for addressing abnormality. Therefore, at time t12, power storage voltage VC is slightly consumed and lowers.

In the example shown in FIG. 8, abnormality sensing apparatus 100A senses abnormality of bearing 5 based on the time derivative value (inclination G or the rate of change) of the amount of stored power. When there are a plurality of rotation speeds to be used as shown in FIG. 7, abnormality of bearing 5a may be sensed based on following relation between inclination G of the amount of power storage and the rotation speed by setting a judgment threshold value for inclination G in correspondence with the rotation speed as described with reference to step S13.

Abnormality sensing apparatus 100A may determine abnormality of the bearing based on relation (followability) between the amount of power generation and another parameter (vibration, a temperature, a motor current value, load, or thermal displacement).

(Another Exemplary Arrangement of Peltier Element)

Though an example in which the power generator including the Peltier element is arranged in the spacer is shown in the description above, the power generator may be arranged at another location close to the heat generation source of the bearing.

Figure 9:
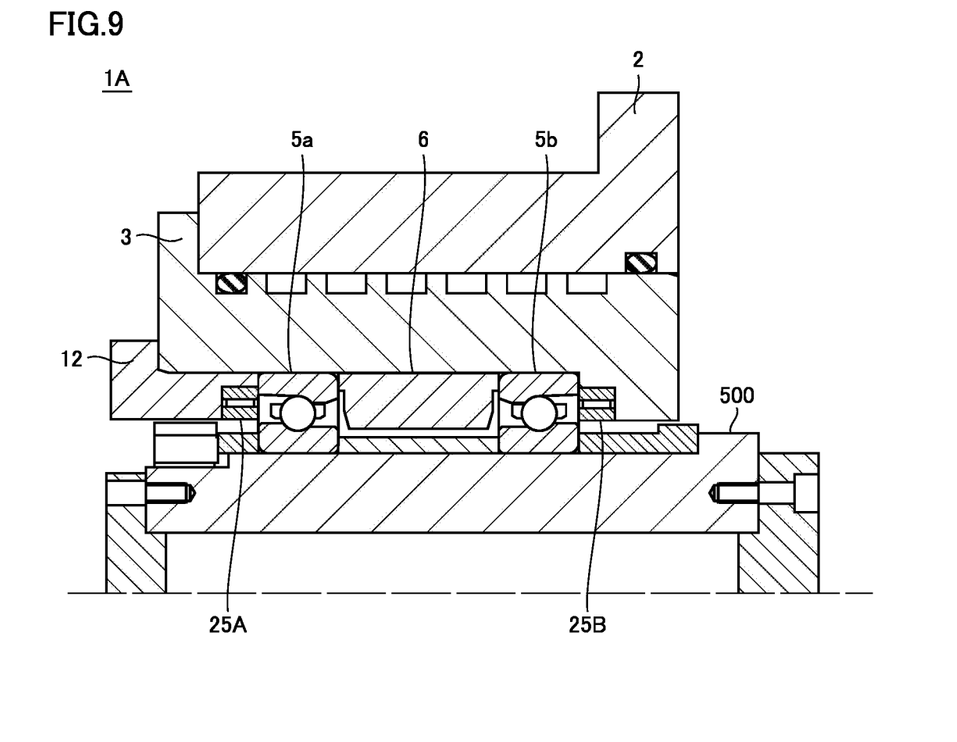
FIG. 9 is a cross-sectional view showing an example in which a power generator is arranged in a housing and a front lid of a spindle apparatus.

FIG. 9 is a cross-sectional view showing an example in which a power generator is arranged in a housing and a front lid of a spindle apparatus. A spindle apparatus 1A shown in FIG. 9 includes bearings 5a and 5b, spacer 6 arranged adjacently to bearings 5a and 5b, and rotating body 500. Rotating body 500 is rotatably supported by a plurality of bearings 5a and 5b provided in housing 3 embedded in the inside portion of bearing jacket 2. Bearings 5a and 5b are fixed to the spindle apparatus by inserting a front lid 12 into housing 3 and fastening the front lid with a bolt or the like.

In such a construction, a power generator 25A may be arranged in front lid 12 adjacent to bearing 5a and a power generator 25B may be arranged in housing 3 adjacent to bearing 5b.

Figure 10:
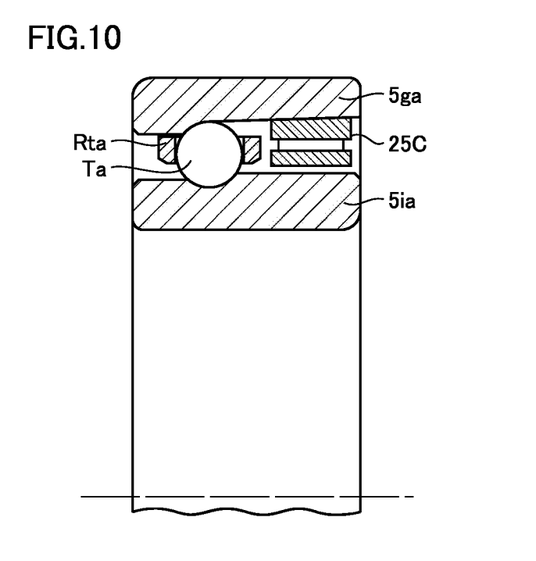
FIG. 10 is a cross-sectional view showing an example in which a power generator including a Peltier element is arranged in the inside of a bearing.

FIG. 10 is a cross-sectional view showing an example in which a power generator including a Peltier element is arranged in the inside of a bearing. As shown in FIG. 10, a power generator 25C may be provided on an inner circumferential surface of outer ring 5ga and power generator 25C and a processing circuit that processes an output signal therefrom may be arranged adjacently thereto. A signal processed by the processing circuit is transmitted to another control circuit through a line. The processing circuit performs, for example, processing for amplifying a signal or processing for A/D conversion.

In this case, when the bearing is small in size, a space for arranging power generator 25C and the processing circuit gives rise to a problem. As shown in FIG. 10, as necessary, the inner circumferential surface of outer ring 5ga of the bearing where power generator 25C and the processing circuit are arranged may be extended in the axial direction, and inner ring 5ia opposed thereto may also similarly be extended in the axial direction. In this case, rolling element Ta is preferably arranged toward a side where power generator 25C is not arranged, relative to a central position in the axial direction of outer ring 5ga.

In the bearing apparatus according to the first and second embodiments described above, abnormality such as burning of the bearing can be sensed or a state of the bearing can be monitored without introducing a large-scale annexed facility for measuring a temperature of the inner ring. Electric power generated by the Peltier element can be utilized not only for sensing abnormality of the bearing but also for representation of a warning on the occurrence of abnormality of the bearing or drive of a lubrication pump for supply into the bearing.

It should be understood that the embodiments disclosed herein are illustrative and non-restrictive in every respect. The scope of the present invention is defined by the terms of the claims rather than the description of the embodiments above and is intended to include any modifications within the scope and meaning equivalent to the terms of the claims.

REFERENCE SIGNS LIST 1 bearing apparatus; 1A spindle apparatus; 2 bearing jacket; 3 housing; 12 front lid; 5, 5a, 5b bearing; 5ga, 5gb outer ring; 5ia, 5ib inner ring; 6 spacer; 6g outer-ring spacer; 6i inner-ring spacer; 25, 25A, 25B, 25C power generator; 25g, 25i heat sink; 25m thermoelectric element; 26, 26A electric circuitry; 27 microcomputer; 27b converter; 27c memory; 28 pump drive circuit; 29 pump; 54 infrared transmitter; 67a, 67b lubricating oil supply path; 82 rectification diode; 85 power supply; 86 power storage apparatus; 91 switch; 100, 100A abnormality sensing apparatus; 500 rotating body

The invention claimed is:

1. A bearing apparatus that supports a rotating body with a bearing, the bearing including an inner ring, an outer ring, and a rolling element, the bearing apparatus comprising:
   a power generator including a Peltier element variable in amount of power generation depending on a temperature difference between the inner ring and the outer ring caused in the bearing; and
   an abnormality sensing apparatus that senses abnormality of the bearing based on the amount of power generation by the power generator.

2. The bearing apparatus according to claim 1, wherein the abnormality sensing apparatus senses abnormality of the bearing based on at least one of the amount of power generation, a time derivative value of the amount of power generation, and following relation between the amount of power generation and another parameter.

3. The bearing apparatus according to claim 1, further comprising:
   a power storage apparatus in which electric power generated by the power generator is stored;
   a load circuit that uses electric power in the power storage apparatus; and
   a power supply that supplies a power supply voltage to the load circuit upon receiving a voltage of the power storage apparatus.

4. The bearing apparatus according to claim 1, further comprising a power storage apparatus in which electric power generated by the power generator is stored, wherein the abnormality sensing apparatus senses abnormality of the bearing based on a value resulting from time derivative of an amount of stored power in the power storage apparatus.

5. The bearing apparatus according to claim 1, further comprising a spacer arranged adjacently to the bearing, wherein
   the spacer includes
      an inner-ring spacer that abuts on the inner ring, and
      an outer-ring spacer that abuts on the outer ring, and
   the power generator is arranged in the outer-ring spacer.

6. The bearing apparatus according to claim 1, wherein the bearing apparatus is configured to support a rotation shaft of a machine tool.

7. A spacer arranged adjacently to a bearing that supports a rotating body, the bearing including an inner ring, an outer ring, and a rolling element, the spacer comprising:

a power generator including a Peltier element variable in amount of power generation depending on a temperature difference between the inner ring and the outer ring caused in the bearing; and an abnormality sensing apparatus that senses abnormality of the bearing based on the amount of power generation by the power generator.

8. The spacer according to claim 7, wherein the spacer includes:

an inner-ring spacer that abuts on the inner ring; and an outer-ring spacer that abuts on the outer ring, wherein the power generator is arranged in the outer-ring spacer.

\* \* \* \* \*